United States Patent [19]

Hays

[11] Patent Number: 5,041,477

[45] Date of Patent: Aug. 20, 1991

[54] OLIGOMERIC AROMATIC DISPERSING AGENTS, METHOD OF MAKING SAME, AND DISPERSIONS MADE THEREFROM

[75] Inventor: Byron G. Hays, Verona, N.J.

[73] Assignee: BASF Corporation

[21] Appl. No.: 404,119

[22] Filed: Sep. 7, 1989

[51] Int. Cl.$^5$ ............................................. C08G 18/72
[52] U.S. Cl. ......................................... 524/88; 524/90;
524/190; 524/315; 524/356; 524/379; 524/590;
528/49; 528/74; 528/85; 560/19; 560/26;
560/158; 564/48; 564/55
[58] Field of Search ............... 524/88, 190, 90, 315,
524/356, 379, 590; 528/49, 74, 85; 560/19, 26,
158; 564/48, 55

[56] References Cited

U.S. PATENT DOCUMENTS 3,728,301  4/1973  Spence et al. .................. 524/589

*Primary Examiner*—Maurice J. Welsh
*Assistant Examiner*—Rachel Johnson

[57] ABSTRACT

An oligomeric aromatic pigment dispersant is the reaction product of a diisocyanate and a diol or diamine. The oligomeric dispersant is comprised of at least 25 weight percent of a compound of the formula:

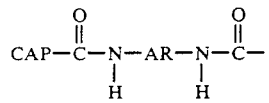

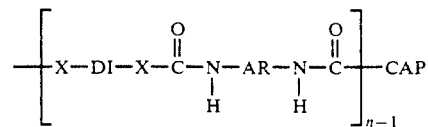

wherein n is an integer of from 3 to 15, AR is a residual aromatic connecting group, DI is a residual organic connecting group, CAP is a capping moiety, and X is a residual connecting group selected from the group consisting of:

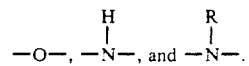

The oligomeric aromatic dispersant has at least 3 aromatic "heads" and 2 aliphatic or rosin "tails".

42 Claims, No Drawings

OLIGOMERIC AROMATIC DISPERSING AGENTS, METHOD OF MAKING SAME, AND DISPERSIONS MADE THEREFROM

FIELD OF THE INVENTION

The present invention pertains to the area of dispersants for pigments, and to a method of dispersing pigments. More particularly, the dispersant of the present invention is an oligomeric reaction product of a reactant which comprises two or more isocyanate groups (hereinafter referred to as a "diisocyanate") with an alkyl-based or rosin-based reactant which comprises two or more alcohol and/or amine groups (hereinafter referred to as "diols" or "diamines"). The present invention also relates to a process for making these pigment dispersants. The oligomeric dispersants are made by reacting a partial stoichiometric excess (or deficiency) of a diisocyanate with the diol and/or the diamine. If a partial stoichiometric excess of diisocyanate is used, the oligomer is capped with an alkyl-based or rosin-based monofunctional or poly-functional amine or alcohol. Finally, the present invention pertains to a method of dispersing pigments with these dispersants.

DESCRIPTION OF THE RELATED ART

The closest art known to the Applicant is U.S. Pat. No. 3,728,301, to Spence and Topham. This patent discloses pigment dispersants which are alkyl-based monomeric (one aromatic or aliphatic "head" containing two or more urea groups), dimeric (two aromatic or aliphatic "heads" containing four or more urea groups) or polymeric (many aromatic or aliphatic "heads" containing many urea groups) dispersants. The present invention differs from the Spence and Topham patent in that the dispersants of the present invention are oligomeric (three to fifteen "heads"), the "heads" are aromatic (not aliphatic), the connecting groups are urethane as well as urea groups, and the alkyl, dialkyl or rosin groups generally are not attached directly to the urea groups, but are attached to an aliphatic linkage between the urethane or urea groups.

Another related patent is U.S. Pat. No. 3,560,235, to Sarfas and Topham. This patent discloses pigment dispersants which contain one basic amino group, contain monomeric, dimeric or polymeric aromatic or aliphatic "heads" and don't require an alkyl, alkenyl, or alkapolyenyl group. The present invention differs from the Sarfas and Topham patent in that the dispersants of the present invention are oligomeric (three to fifteen "heads"), the "heads" are aromatic (not aliphatic) and the linkages connecting the urethane or urea groups must contain alkyl, dialkyl or rosin moieties.

Another related patent is U.S. Pat. No. 4,294,620, to Sappok and Kranz. This patent discloses pigment dispersants which are monomeric, aromatic diureas with two alkyl, alkylamine, etc. groups. The present invention differs from the Sappok and Kranz patent in that the dispersants are oligomeric, not monomeric, and contain several alkyl, dialkyl, and rosin moieties.

U.S. Pat. Nos. 4,042,413 and 4,157,266, to Hauxwell, et al disclose pigment dispersants which are polymeric and contain polyester connecting groups.

U.S. Pat. No. 4,224,212, to Topham, discloses pigment dispersants which are polymeric, contain polyester connecting groups, and contain no aromatic "heads".

Two articles on pigment dispersants have been written by the inventor of the present invention:
(1) Surface Treatment of Organic Pigments for Printing Ink Applications, *American Ink Maker*, June, 1984, pp 28 et al;
(2) A Model for Organic Pigments in Oil- or Water-Based Printing Inks, *American Ink Maker*. October, 1986, pp 13-21.

These articles discuss a variety of dispersing agents, among which are the bis (alkylureas) of U.S. Pat. No. 4,294,620, cited above. In contrast to the dispersants of the present invention, the dispersants in these articles are not oligomeric and contain at most one aromatic "head". As the inventor points out in these articles, the purpose of these dispersants is to cover the polar top and bottom faces of the organic pigment crystals and shield these high energy faces from the low energy nonpolar oily vehicle. This shielding is accomplished by the one or two fatty alkyl "tails" of the monomeric dispersant (as described in these two articles) projecting out from the adsorbed dispersant into the oily vehicle. In contrast, the oligomeric dispersant of the present invention provides a multiplicity of alkyl-based or rosin-based "tails" for shielding the polar faces of organic pigments, these "tails" alternating with a multiplicity of interspersed aromatic "heads". For each molecule of dispersant that happens to be adsorbed, the alkyl-based or rosin-based tails provide many "springs" for stearic repulsion between pigment particles, producing a stable dispersion of pigment particles.

BRIEF SUMMARY OF INVENTION

The present invention pertains to a new reaction product which is useful as a pigment dispersant. In addition, the present invention pertains to both a method for making the dispersant as well as a method for using the dispersant.

The oligomeric aromatic reaction product of the present invention is comprised of at least 25 weight percent of a compound of the formula:

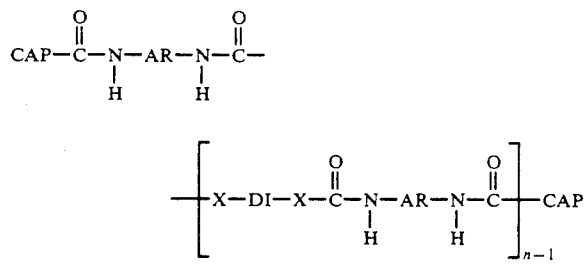

In this formula, AR represents a residual aromatic connecting group which consists at least two nitrogen atoms of at least two urethane or urea moieties. X represents a residual connecting group selected form the group consisting of

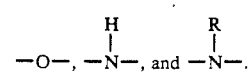

DI represents a residual organic connecting group which connects two X connecting groups. A substituent is located on one (or more) member(s) selected from the group consisting of X and DI. The substituent is selected from the group consisting of rosin moieties and alkyl moieties having at least 8 carbon atoms. CAP represents a capping moiety. The oligomer has at least two capping moieties thereon. Each capping moiety is selected from the group consisting of residual monoamine moieties, residual monoalcohol moieties, residual diamine or polyamine moieties, and residual diol or polyol moieties.

The method of making the oligomeric aromatic dispersants of the present invention comprises reacting an aromatic diisocyanate with a member selected from the group consisting of diols and diamines having at least one substituent thereon, wherein the substituent is selected from the group consisting of rosin substituents and alkyl substituents of at least 8 carbon atoms, so that an oligomeric aromatic reaction product is formed.

Finally, the present invention is a method of dispersing pigments, the method comprising the steps of:
(a) mixing an oligomeric aromatic dispersant with a pigment; and
(b) milling the oligomeric aromatic dispersant with the pigment.

The oligomeric aromatic dispersant of the present invention provides advantages over other pigment dispersants used in oil-based printing inks. The oligomeric aromatic dispersant of the present invention has multiple points of association with the polar surfaces of the pigment particles. As is explained in the articles in *American Ink Maker* (supra, which are hereby incorporated by reference), an aromatic "head" has a strong tendency to bond with the aromatic polar regions on the faces of the organic pigment particles. The monomeric or dimeric aromatic pigment dispersants of the prior art have only one or two aromatic "heads" and are therefore held to the pigment surface by, in effect, only one or two points. Monomeric or dimeric dispersants tend to have moderate to high solubility in the vehicles used for dispersion. Once the dispersant has desorbed from the pigment surface, the dispersant molecules tend to move around in the vehicle, rather than re-adsorb on the pigment surface and act as dispersants. Conversely, with oligomeric or polymeric dispersants, the multiple "heads" tend to keep the dispersant adsorbed on the pigment surface. Even though the individual aromatic "heads" are in a dynamic equilibrium, adsorbing and desorbing as rapidly as the "heads" of monomeric or dimeric dispersants, the desorbed "heads" of an oligomeric or polymeric dispersant are, at any instant, positioned close to the pigment surface by the nearby adsorbed "heads", greatly increasing the probability of re-adsorption of these "heads". This greatly increases the association constant for adsorption and makes oligomeric and polymeric dispersants much more effective than monomeric or dimeric dispersants.

The oligomeric aromatic pigment dispersant of the present invention also provides advantages over polymeric aromatic dispersants, such as are described in U.S. Pat. Nos. 3,728,301 and 3,560,235. Being more soluble, oligomeric aromatic dispersants are more easily dissolved or solubilized than polymeric aromatic dispersants. Thus oligomeric aromatic dispersants are more rapidly adsorbed onto the surfaces of pigment particles. Beyond a certain number of points of bonding, the extra aromatic "heads" of a polymeric dispersant do not significantly increase the overall bonding. The number of points of bonding of oligomeric dispersants is sufficient. For a given weight of dispersant, oligomeric dispersants offer more molecules of dispersant than offered by polymeric dispersants. Polymeric dispersants tend to increase the viscosity of a dispersion more than oligomeric dispersants. In summary, oligomeric aromatic dispersants are more effective than corresponding polymeric aromatic dispersants.

DETAILED DESCRIPTION OF THE PREFERRED EMBODIMENTS

As stated above, the oligomeric aromatic dispersant is a reaction product which comprises at least 25 weight percent of a compound of the formula:

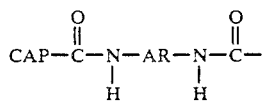

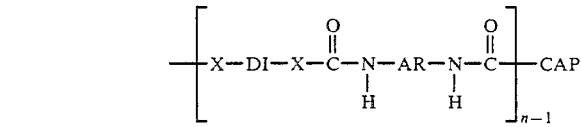

The term "reaction product" is used with reference to any reaction by which the compound is produced. Such patents as U.S. Pat. Nos. 3,560,235 and 3,728,301 refer to reactions which produce polymers. Of course, the statistical distribution in the degree of polymerization dictates that a very small fraction of oligomer is also produced, albeit unintentionally, in the polymerization process. The reaction product of the present invention must be at least 25 weight percent oligomer, in contrast to the incidental production of oligomer in the '235 and '301 patents, which undoubtedly produce below 5 weight percent oligomer. Preferably the reaction product of the present invention is at least 90 weight percent oligomer. Although the oligomeric dispersant may be made by more than one specific reaction, the preferred reaction involves reacting an aromatic diisocyanate with a diol and/or a diamine. In order to obtain the oligomer, there cannot be equivalent amounts of both the diisocyanate and the diol or diamine. Equivalent amounts of the diisocyanate and the, for example, diol, produce a polymer, not an oligomer. Rather, there must be a significant stoichiometric excess of either the diisocyanate or, for example, the diol. "Excess", as used herein, requires that there be at least 5 mole percent more of one reactant (e.g. The diisocyanate) than the other reactant (e.g. The diol).

In the above formula, "AR" represents a residual aromatic connecting group. Preferably the AR is the residual group left from the reaction of the aromatic diisocyanate. Since the residue from the "—N=C=O" groups of the diisocyanate are shown beside the AR group in the above formula, it is apparent that the AR group represents only the remainder of that portion of (what was previously) the diisocyanate. Preferred AR groups comprise:

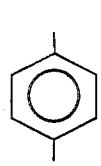 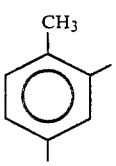 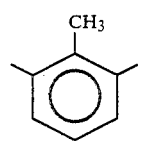

(I)        (II)        (III)

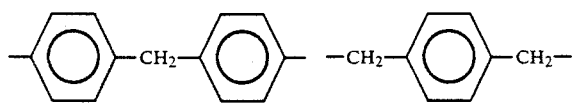

(IV)    (V)

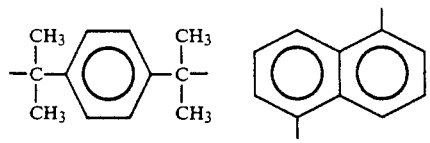

(VI)    (VII)

More preferred AR groups are (I), (II), (III), (IV), (V) and (VII) above. Most preferred AR groups are: IV, and an 80:20 mixture of II and III. The term "residual", as applied to the connecting group within the oligomer, refers to the fact that the connecting group was previously part of a reactant, which group is now a part of the product, i.e. a part of the oligomer. Thus the preferred (and most preferred) AR groups listed above are "residual" from the diisocyanate reactant. In the oligomeric dispersant, the AR connecting group always connects at least two nitrogen atoms of two or more urethane or urea moieties.

DI represents a residual organic connecting group in the oligomer. The DI group connects two X connecting groups. The X connecting groups represent a residual connecting group selected from the group consisting of

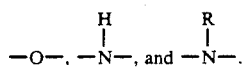

Before the reaction forming the oligomer is carried out, a DI group, together with two adjacent X groups, represents either a diol or a diamine. Each X connecting group is that residual portion of an alcohol or amine functionality on the original diol or diamine, respectively. The DI connecting group represents that remaining portion of the diol or diamine which is between the alcohol or amine functional groups. Just as with the AR connecting group, the DI connecting group is also termed a residual group, as the DI group is the residue of that portion of the diol or diamine reactant which becomes part of the oligomeric product. The DI group is always organic, and is preferably aliphatic.

Substituents are located on either the X or DI connecting groups, or on both the X groups and the DI groups. The substituent is selected from the group consisting of rosin moieties, and alkyl moieties having at least 8 carbon atoms. The rosin or alkyl substituent may be attached to the X group only if the X group is

Preferably the substituent group is aliphatic. Preferred rosin substituent groups are: abietyl, dehydroabietyl, dihydroabietyl, and tetrahydroabietyl. Preferred alkyl substituents are: octyl, decyl, dodecyl, tridecyl, tetradecyl, hexadecyl, octadecyl, eicosyl and docosyl. Most preferred substituent groups are abietyl, dehydroabietyl, octyl, decyl, dodecyl, and tetradecyl. More than one species of substituent may be utilized within an oligomer. Furthermore, if n=3, the residual monoamine, monoalcohol, diamine, polyamine, diol, and polyol moieties comprise a substituent selected from rosin substituents and alkyl substituents having at least 8 carbon atoms.

The oligomeric reaction product further comprises two capping moieties. The capping moieties are represented by CAP in the formula above. Each capping moiety is selected from the group consisting of residual monoamine moieties, residual monoalcohol moieties, residual diamine moieties, and residual diol moieties. If a stoichiometric excess of diol or diamine is used (with respect to the number of equivalents of isocyanate) to make the oligomer, then the excess diol or diamine reactants can also serve as the capping moieties. The amount of the excess of diol and/or diamine required to eliminate the need to add a separate reactant to serve as a capping moiety is determined by the desired degree of oligomerization. That is, if it is desired that n=3, then a 33 percent excess (based on equivalents) of diol and/or diamine is necessary in order to eliminate the need to use a separate capping reactant. If it is desired that n=8, then an excess (based on equivalents) of diol and/or diamine of 12.5 percent is necessary in order to eliminate the need to use a separate capping reactant. If a stoichiometric excess of diisocyanate is used, then an additional capping reactant must be used. Suitable capping reactants include monoamines, monoalcohols, diamines, diols, polyamines, and polyols. Upon reacting with the oligomer, the capping reactant becomes a capping moiety. The capping moiety (i.e. CAP, as used in the formula) is herein referred to as a "residual" moiety. Suitable residual capping moieties include residual monoamine moieties, residual monoalcohol moieties, residual diamine or polyamine moieties, and residual diol and polyol moieties. In general a capping moiety will be of one of the types:

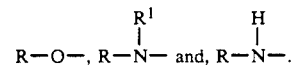

Preferably the capping moiety is a residual monoamine moiety or a residual monoalcohol moiety.

In the formula above, "n" represents the degree of oligomerization. As defined herein, n represents an integer of from 3 to 15. The term "oligomer", as used herein, refers to reaction products corresponding to the above formula wherein n is an integer from 3 to 15. Preferably n represents an integer of from 8 to 10. n Cannot be less than 3. The capping moieties (described above) preferably have an alkyl, a dialkyl, or a rosin substituent group thereon. Thus it can be deduced that the oligomeric aromatic dispersant has a minimum of 3 aromatic "heads" and 2 alkyl or rosin "tails" (e.g., if n=3, there are 3 AR groups, and each of the 2 DI groups has 1 tail).

If alkyl-substituted oligomeric aromatic dispersants are to be made, a preferred alkyl-based diamine is N-tallow-, bis-(3-aminopropyl) amine, e.g. Kenobel's Lilamin ® LSP-33. Preferred diols are Mazer Chemicals' Mazeen ® C-2 and T-2 and Armak Chemicals' Aromox ® C/12 and T/12, and Ethoquad ® C/12 and O/12. Preferred alkyl-substituted capping compounds are Armak's Armeen ® C and T, Duomeen ® C and T, dodecanol and octadecanol.

If dialkyl-substituted oligomeric aromatic dispersants are to be produced, preferred dialkyl-based diols are: (1) a dialkyl ester of a tetrol [e.g. The reaction product of two moles of dodecanoic acid with one mole of pentaerythritol] and (2) an alkyl bis(2-hydroxyethyl) amine quaternized with an alkyl halide, sulfate, etc. [e.g., the reaction product of Mazeen C-2 and dodecyl bromide]. A preferred dialkyl-based diamine is dimer (acid) diprimary amine (e.g. Kemamine ® DP 3695, manufactured by Humko Sheffield). Preferred dialkyl substituted capping compounds include Armeen ® 2C and Armeen ® 2HT, both of which are manufactured by Armak. Also preferred as a capping compound is Kemamine ® S-190 (dieicosylamine/didocosylamine), manufactured by Humko Sheffield, as well as glycerol dioleate.

If rosin-based oligomeric aromatic dispersants are to be produced, preferred rosin-based diols include: a bis(2-hydroxyethyl) dehydroabietyl amine (e.g. Mazeen ® 223-52, produced by Mazer Chemicals). The preferred rosin based diamine is made by the addition of two moles of acrylonitrile to dehydroabietylamine (e.g. Amine D ®, produced by Hercules), followed by reduction to the diamine. The preferred rosin-based capping agents are dehydroabietylamine (Amine D ®) and hydroabietyl alcohol (e.g. Abitol ®, produced by Hercules).

The present invention is also concerned with a method of making oligomeric aromatic dispersants for pigments. This method comprises reacting an aromatic diisocyanate with a member selected from the group consisting of diols having at least one substituent thereon and diamines having at least one substituent thereon, wherein the substituent is selected from the group consisting of rosin substituents and alkyl substituents of at least 8 carbon atoms. The reaction must be carried out so that an oligomeric aromatic product is formed. The reaction of the aromatic diisocyanate with the substituted diol (or substituted diamine) forms an oligomeric aromatic intermediate. Preferably the oligomeric aromatic intermediate is then capped with a capping compound. The capping compound is preferably a member selected from the group consisting of monoalcohols and monoamines.

The oligomeric dispersant is formed by reacting the diisocyanate with the diol (or diamine) in a ratio (based on equivalents) which produces an oligomeric intermediate rather than a polymeric intermediate or a dimeric intermediate. A ratio (based on equivalents) of diisocyanate: diol (or diamine) of between 0.67:1 and 1:33:1 produces the oligomeric aromatic dispersant so long as the ratio is not between 0.95:1 and 1.05:1. If the ratio is between 0.95:1 and 1.05:1, the resulting intermediate will be polymeric, not oligomeric. Thus the ratio of diisocyanate:diol (or diamide) should be between 0.67:1 and 1.33:1 but not between 0.95:1 and 1.05:1.

As used herein, the term "diol" refers to all molecules which have at least two alcohol functionalities thereon. In other words, diol refers to diols, triols, tetrols, etc. Likewise, the term "diamine" as used herein, refers to diamines, triamines, tetramines, etc. Furthermore, the term "diisocyanate", as used herein, refers to diisocyanates, triisocyanates, tetraisocyanates, etc. As stated above, the ratio of the diisocyanate:diol (or diamine) is a ratio based upon equivalents. Thus the ratio is a ratio of isocyanate functionalities to alcohol (or amine) functionalities, rather than a ratio of the number of diisocyanate molecules to diol (or diamine) molecules.

A preferred aromatic diisocyanate for use in the method may be selected from the group consisting of phenylene diisocyanate, toluene diisocyanate, methylene diphenylenediisocyanate, xylylene diisocyanate, tetramethylxylene diisocyanate, naphthalene diisocyanate, polymethylene polyphenyl isocyanate, polyisocyanurates of toluene diisocyanates and toluene diisocyanate-based adducts of triols.

Preferably the diols and diamines are aliphatic diols and aliphatic diamines. Preferably the diols and diamines are substituted with a rosin substituent and/or an alkyl substituent having at least 8 carbon atoms.

Preferably the oligomeric intermediate is capped with a capping compound selected from the group consisting of substituted monoamines and substituted monoalcohols, the substituent being selected from the group consisting of rosin substituents and alkyl substituents having at least 8 carbon atoms. Dialkyl substituents are also preferred substituents for the capping compounds.

The present invention is also concerned with a dispersion of a finely divided organic solid in an organic liquid containing from 1 weight percent to 20 weight percent (based on weight of solids) of an oligomeric aromatic dispersant of the formula:

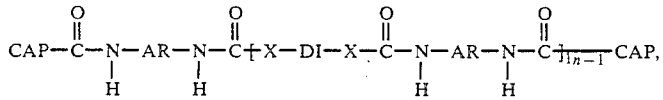

in which AR, X, DI, and CAP are as described above. Preferably the dispersion comprises from 5 weight percent to 12 weight percent (based on weight of solids) of the oligomeric aromatic dispersant. Preferably the organic solid is an organic pigment. More preferably the organic pigment is selected from the group consisting of monoazo pigments, disazo pigments, phthalocyanine pigments, quinacridone pigments, and carbon black pigments. Preferably the organic liquid is selected from the group consisting of aliphatic middle distillates (e.g. Magiesol ® 47), toluene, low boiling aliphatic distillates (i.e. 90°-110° C. boiling point), and low boiling point (i.e. <140° C.) esters, ketones, and alcohols.

The present invention is also concerned with a method of making a pigment dispersion by high-shear mixing an organic pigment in the presence of an oligomeric aromatic dispersant of the formula:

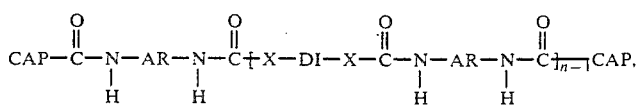

wherein AR, X, DI, and CAP are as described above. Preferably the pigmentary material is high-shear mixed with the dispersant in a mixer selected from the group consisting of high speed disc dispersers, kneaders, media mills, 3-roll mills, and 2-roll mills. The resulting pigment dispersion may be used in either oil-based printing inks or in solvent-based printing inks, as well as in paints. The organic pigment which is high-shear mixed with the oligomeric aromatic dispersant is preferably a pigment selected from the group consisting of monoazo pigments, disazo pigments, phthalocyanine pigments, quinacridone pigments, and carbon black pigments.

In addition to a method for making a pigment dispersion by high-shear mixing an organic pigment with an oligomeric aromatic pigment dispersant, the present invention is also concerned with a method of making a pigment dispersion by milling an organic pigment crude in the presence of an oligomeric aromatic dispersant of the formula:

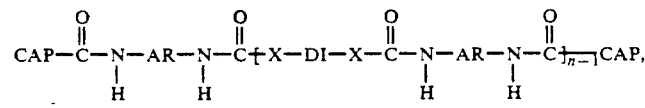

wherein AR, X, DI, and CAP are as described above. Preferably the milling of the pigment crude is carried out in a grinding media mill selected from the group consisting of ball mills and shot mills. The resulting pigment dispersion may be used in both oil-based printing inks and solvent-based printing inks, as well as in paints. The pigment crude is preferably selected from the group consisting of monoazo pigment crudes, disazo pigment crudes, phthalocyanine pigment crudes, quinacridone pigment crudes, and carbon black pigment crudes.

The following examples illustrate several preferred embodiments of the product and process of the present invention. Unless otherwise specified, all parts and percents given are parts and percents by weight.

EXAMPLE 1

A solution of 72.4 parts (667 meq) of coco (dodecyl/tetradecyl) bis(2-hydroxyethyl)amine (Mazeen ® C-2, obtained from Mazer Chemicals Company) in 289.6 parts toluene was stirred under nitrogen in a 50° C. constant temperature bath. [Mazeen ® C-2 has a minimum of 92 percent tertiary amine, and had a reaction equivalent weight of 110 to toluene diisocyanate, and a neutralization equivalent weight of 290 to HCl.] To this solution was added (over a one-hour period) a solution of 43.5 parts (500 meq) of an 80/20 mixture of 2,4- and 2,6-toluene diisocyanate (Lupranate ® T80-2, produced by BASF Corporation) the Lupranate ® T80-2 solution having initially been diluted with 157.5 parts toluene, followed by being rinsed with 16 parts toluene. [Lupranate ® T80-2 was assumed to be pure, and to have a reaction equivalent weight of 87.1.] The combined solutions were stirred at 50° C. for 3 hours, followed by being boiled for 2 hours. Analysis of the resulting reaction product revealed no residual isocyanate, using a 0.1 N dibutylamine in toluene/isopropanol/bromophenol blue/0.1 N hydrochloric acid procedure. The toluene was removed under reduced pressure at 130°-150° C. from 270 parts of the solution to give 53.8 parts of a brittle pale amber alkyl-based aromatic oligomer with an average degree of oligomerization of 3. This oligomer is pulverized and then mixed with pigment and a vehicle in a high speed mixer, in order to make a premix. The premix is then milled in a shot mill or a three roll mill to produce a dispersed pigment concentrate. The pigment concentrate is then let down with vehicles and additives to produce a printing ink or paint.

EXAMPLE 2

The procedure of Example 1 was followed, except that 34.8 parts (400 meq) of an 80/20 mixture of 2,4- and 2,6-toluene diisocyanate, (i.e. Lupranate ® T80-2, produced by BASF Corporation) in 144.2 parts of toluene were added to a solution of 48.8 parts (450 meq) of coco (dodecyl/tetradecyl) bis(2-hydroxyethyl)amine (i.e. Mazeen ® C-2) in 195.2 parts of toluene. These reactants were stirred 8 hours before being boiled for 2 hours. Solvent removal under reduced pressure at 130°-150° C. gave 81.7 parts of a flexible tough pale amber alkyl-based aromatic oligomer with an average degree of oligomerization of 8.

EXAMPLE 3

The process of Example 2 was followed, except that a solution containing 34.8 parts (400 meq) of an 80/20 mixture of 2,4- and 2,6-toluene diisocyanate (Lupranate ® T80-2) in 140.2 parts toluene was added to a solution of 46.3 parts (427 meq) of coco (dodecyl/tetradecyl) bis(2-hydroxyethyl)amine (Mazeen ® C-2) in 2) in 185.7 parts toluene. The reactants were stirred at 50° C. for 9 hours before being boiled for 2 hours. An analysis of aliquots taken both before and after boiling indicated no residual isocyanate. 80.2 Parts of a flexible, tough pale amber alkyl-based aromatic oligomer with an average degree of oligomerization of 15 were obtained.

EXAMPLE 4

The procedure of Example 2 was followed, except that 34.8 parts (400 meq) of an 80/20 mixture of 2,4- and 2,6-toluene diisocyanate (Lupranate ® T80-1, produced by BASF Corporation) in 139.2 parts toluene were added to a solution of 38.0 parts (350 meq) coco(dodecyl/tetradecyl) bis(2-hydroxyethyl)amine (i.e. Mazeen ® C-2) in 152 parts toluene. [Lubranate ® T80-1 was assumed to be pure, and to have a reaction equivalent weight of 87.1] Analysis of aliquots taken before and after boiling showed essentially the same concentration of excess isocyanate. After boiling, 10.0 parts (50 meq) coco(dodecyl/tetradecyl) amine (Jetco Chemical Company's Jetamine ® PCD), dissolved in °parts toluene, were added over 5 minutes. Solvent removal under reduced pressure at 130°-150° C. gave 76.6 pats of a friable pale amber alkyl-based aromatic oligomer with an average degree of oligomerization of 8 and capped with alkyl urea groups.

EXAMPLE 5

The procedure of Example 1 was followed, except that 58 parts of a solution of 17.4 parts (200 meq) of an 80/20 mixture of 2,4- and 2,6-toluene diisocyanate (Lupranate ® T80-2), in 40.6 parts toluene were added to 232 parts of a solution containing 69.5 parts (272 meq)

didodecanoyl pentaerythritate and 0.5 part dibutyltindilaurate (DBTDL) in 162 parts toluene. [The didodecanoyl pentaerythritate was synthesized by azeotrophic distillation of water from 2 moles of dodecanoic acid (Armak Chemical's Neofat ® 12) and 1 mole of monopentaerythritol (Perstorp Polyols) at 175°–185° C. with about 10% xylene, followed by heating to 230°–250° C. until the acid number was less than 2. The resulting didodecanoyl pentaerythritate had a reaction equivalent weight of 258 to toluene diisocyanate]. The reactants were stirred at 50° C. for 6 hours, after which the reactants were boiled for 5½ hours. Analysis of aliquots taken indicated that the oligomerization was 90 percent complete before boiling and 100 percent complete after boiling. Solvent removal under reduced pressure at 130°–150° C. gave 78.1 parts of a tacky, flexible pale amber dialkyl-based aromatic oligomer having an average degree of oligomerization of three.

EXAMPLE 6

The procedure of Example 5 was followed, except that 77 parts of a solution of 15.3 parts (176 meq) of an 80/20 mixture of 2,4- and 2,6-toluene diisocyanate (Lupranate ® T80-2), in 61.7 parts toluene, were added to 252 parts of a solution containing 50.5 parts (198 meq) didodecanoyl pentaerythritate and 0.1 parts DBTDL in 201.4 parts toluene. The reactants were stirred at 50° C. for 5 hours, after which another 0.1 part DBTDL was added and stirred overnight, after which the reactants were boiled for 7 hours. Analysis of aliquots taken indicated that the oligomerization was 93 percent complete before boiling and essentially complete after boiling. 59.8 Parts of a slightly tacky and brittle pale amber dialkyl-based aromatic oligomer with an average degree of oligomerization of 8 were obtained.

EXAMPLE 7

The procedure of Example 5 was followed, except that 105 parts of a solution containing 20.9 parts (240 meq) of an 80/20 mixture of 2,4- and 2,6-toluene diisocyanate (Lupranate ® T80-1), in 84.1 parts toluene, were added to 273 parts of a solution containing 54.6 parts (210 meq) didodecanoyl pentaerythritate and 0.6 part DBTDL in 217.8 parts toluene. The reactants were stirred at 50° C. for 6 hours before being boiled for 2 hours, and 10.7 parts (30 meq) bis(dodecyl/tetradecyl)amine (Armak Chemical Company's Armeen ® 2C) dissolved in 39 parts toluene were added over 10 minutes to the boiling solution. Solvent removal under reduced pressure at 130°–150° C. gave 78.5 parts of a slightly tacky, flexible pale amber dialkyl-based aromatic oligomer with an average degree of oligomerization of 8 and capped with dialkyl urea groups.

EXAMPLE 8

The procedure of Example 1 was followed, except that 52 parts of a solution containing 15.7 parts (180 meq) of an 80/20 mixture of 2,4- and 2,6-toluene diisocyanate (Lupranate ® T80-1) in 36.3 parts of toluene were added to 228 parts of a solution containing 68.5 parts (240 meq) of dehydroabietyl bis(2-hydroxyethyl)amine (Mazeen ® 223-52) and 0.5 part DBTDL, in 159 parts toluene. [Mazeen ® 223-52 is a rosin-based diol having a reaction equivalent weight of 290 to toluene diisocyanate and 93% tertiary amine with a neutralization equivalent weight of 450 to HCl.] The reactants were stirred at 50° C. for 8 hours before being boiled for 2 hours. An analysis of aliquots taken indicated that oligomerization was complete before boiling. Solvent removal under reduced pressure gave 82.7 parts of a friable dark amber rosin-based aromatic oligomer with an average degree of oligomerization of three.

EXAMPLE 9

The procedure of Example 8 was followed, except that 87 parts of a solution containing 17.4 parts (200 meq) of an 80/20 mixture of 2,4- and 2,6-toluene diisocyanate (Lupranate ® T80-1), in 69.6 parts toluene, were added to 323 parts of a solution containing 64.1 parts (225 meq) of dehydroabietyl bis(2-hydroxyethyl)amine (Mazeen ® 223-52) and 0.5 part DBTDL, in 258.4 parts of toluene. Analysis of aliquots taken indicated that oligomerization was complete before boiling. 80.4 Parts of a friable dark amber rosin-based aromatic oligomer with an average degree of oligomerization of 8 were obtained.

EXAMPLE 10

The procedure of Example 8 was followed, except that 100 parts of a solution containing 20.9 parts (240 meq) of an 80/20 mixture of 2,4- and 2,6-toluene diisocyanate (Lupranate ® T80-1), in 79.1 parts of toluene, were added to 289 parts of a solution containing 59.9 parts (210 meq) of dehydroabietyl bis(2-hydroxyethyl)amine (Mazeen ® 223-52) and 0.5 part DBTDL, in 228.6 parts of toluene. Analysis of aliquots taken indicated that oligomerization to a constant concentration of excess isocyanate was essentially complete before boiling. 9.5 Parts (30 meq) dehydroabietyl amine (Hercules' Amine D ®) dissolved in 10 parts toluene were added to the boiling solution, this addition taking place over a three-minute period. Solvent removal under reduced pressure at 130°–150° C. produced 88.3 parts of a friable amber rosin-based aromatic oligomer with an average degree of oligomerization of 8, the oligomer being capped with rosin-based urea groups.

EXAMPLE 11

20.0 Parts (160 meq) of 4,4'-diphenylmethane diisocyanate (Lupranate ® MS), together with 63.0 parts (214 meq) of dihydroabietyl bis(2-hydroxyethyl)amine (Mazeen ® 223-52) and 0.5 part DBTDL, were diluted with 301.5 parts toluene. The resulting solution was stirred at 50° C. under nitrogen for 8 hours, then boiled for 2 hours. Analysis of aliquots taken before and after boiling indicated essentially complete oligomerization before boiling. 82.2 Parts of a friable, dark amber rosin-based aromatic oligomer with an average degree of oligomerization of 3 wee obtained.

EXAMPLE 12

The procedure of Example 11 was followed, except that 37.5 parts (300 meq) Lupranate ® MS and 44.7 parts (400 meq) coco(dodecyl/tetradecyl) bis (2-hydroxyethyl)amine (Mazeen ® C-2) diluted with 309 parts toluene were allowed to react. Analysis of samples before and after boiling indicated essentially complete oligomerization before boiling. 78.6 parts of a brittle, pale yellow alkyl-based aromatic oligomer with an average degree of oligomerization of 3 were obtained.

EXAMPLE 13

The procedure of Example 11 was followed, except that 31.3 parts (250 meq) Lupranate ® MS and 49.4 parts (334 meq) tallow (octadecyl/hexadecyl) bis(2-hydroxyethyl)amine (Mazeen ® T-2) diluted with 310 parts toluene were allowed to react. [Mazeen ® T-2, an alkyl-based diol, had a reaction equivalent weight of 148 to toluene diisocyanate, and a neutralization equivalent weight of 350 to HCl.] Analysis of samples before and after boiling indicated complete oligomerization before boiling. 78.2 Parts of a brittle, pale yellow alkyl-based aromatic oligomer with an average degree of oligomerization of 3 were obtained.

EXAMPLE 14

The procedure of Example 1 was followed, except that a solution of 34.8 parts (400 meq) Lupranate® T80-2 in 188 parts 4-methyl-2-pentanone (Shell Chemical's methyl isobutyl ketone, dried over molecular sieves) and 125 parts toluene was added to a solution of 49.9 parts (531 meq) tallow (octadecyl/hexadecyl) bis(3-aminopropyl)amine (Kenobel AB's Lilamin® LSP-33) in 270 parts 4-methyl-2-pentanone and 180 parts toluene, that the solution was stirred at 50° C. for 6 hours and that the viscous slightly opalescent solution was not boiled. [Lilamin® LSP-33, an alkyl-based diamine, had a reaction equivalent weight of 94 to toluene diisocyanate, and a neutralization equivalent weight (after reaction with excess toluene diisocyanate) of 408 to HCl.] Analysis of samples showed that oligomerization was complete at one hour after the addition of the Lupranate® T-80 solution. Solvent removal under reduced pressure gave 84.3 parts of a tough, brittle, amber alkyl-based aromatic oligomer with an average degree of oligomerization of 3.

The embodiments of the invention in which an exclusive privilege or property is claimed are defined as follows:

1. An oligomeric aromatic dispersant reaction product which comprises at least 25 weight percent of a compound of the formula:

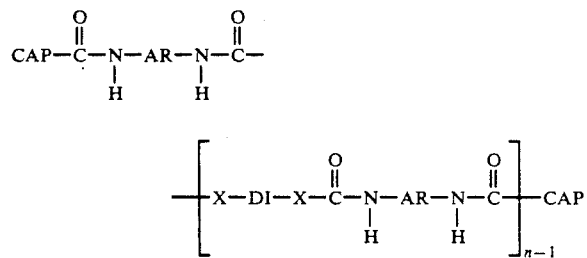

(a) wherein AR represents a residual aromatic connecting group which connects at least two nitrogen atoms of at least two urethane or urea moieties; and
(b) wherein X represents a residual connecting group selected from the group consisting of:

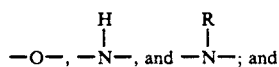

(c) wherein DI represents a residual organic connecting group which connects at least two X connecting groups; and
(d) wherein at least one substituent is located on DI and one substituent may or may not be located on X, the substituent being selected from the group consisting of rosin moieties and alkyl moieties having at least 8 carbon atoms; and
(e) wherein CAP represents a capping moiety, the compound having 2 capping moieties thereon, each capping moiety being selected from the group consisting of residual monoamine moieties, residual monoalcohol moieties, residual diamine moieties, residual monoalcohol moieties, residual diamine moieties, residual polyamine moieties, residual diol moieties, and residual polyol moieties; and
(f) wherein n represents an integer of from 3 to 15.

2. The oligomeric dispersant reaction product as described in claim 1 wherein the reaction product is at least 90 weight percent oligomer.

3. The reaction product as described in claim 2 wherein AR is selected from the group consisting of:

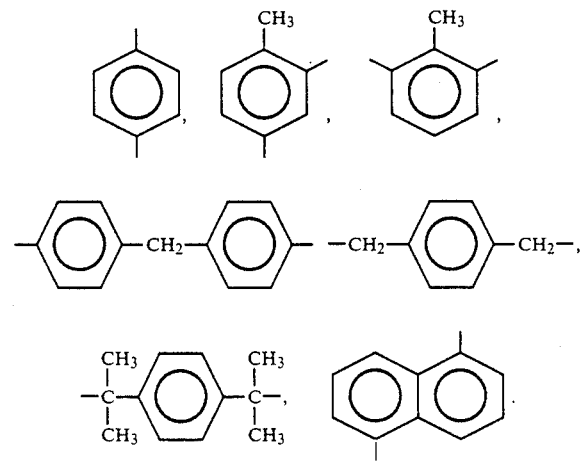

4. The reaction product as described in claim 2 wherein DI represents a residual aliphatic connecting group.

5. The reaction product in claim 2 wherein DI has an alkyl substituent thereon, the alkyl substituent having between 8 and 22 carbon atoms.

6. The reaction product as described in claim 2 wherein DI has a rosin substituent thereon.

7. The reaction product as described in claim 2 wherein DI has a dialkyl substituent thereon, each of the alkyl groups having between 8 and 22 carbon atoms.

8. The reaction product as described in claim 2 wherein n is an integer of from 8 to 10.

9. The reaction product as described in claim 2 wherein the CAP moieties have an alkyl substituent thereon, the alkyl substituent having between 8 and 22 carbon atoms.

10. The reaction product as described in claim 2 wherein the CAP moieties have a rosin substituent thereon.

11. The reaction product as described in claim 2, wherein if n=3, the residual monoamine, monoalcohol, diamine, polyamine, diol and polyol moieties comprise a substituent selected from rosin substituents and alkyl substituents having at least 8 carbon atoms.

12. The reaction product as described in claim 2 wherein X represents

and R represents a substituent selected from the group consisting of rosin substituents, and alkyl substituents having at least 8 carbon atoms.

13. The reaction product as described in claim 1 wherein
(A) AR is selected from the group consisting of

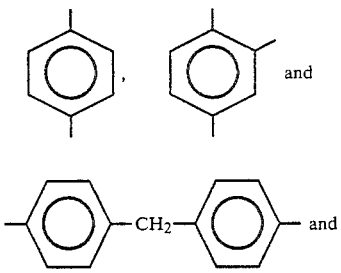

(B) X is selected from the group consisting of

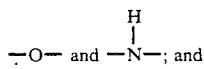

(C) DI is a member selected from the group consisting of residual alkyl substituted connecting groups, residual dialkyl substituted connecting groups, and residual rosin substituted connecting groups; and (D) CAP represents a member selected from the group consisting of alkyl substituted amine moieties, dialkyl substituted amine moieties, rosin substituted amine moieties; and (E) n represents an integer of from 8 to 10.

14. A method of making oligomeric aromatic dispersants for pigments, the method comprising reacting an aromatic diisocyanate with a member selected from the group consisting of diols having at least one substituent thereon and diamines having at least one substituent on the residual organic connecting group which connects at least two —N(HR) groups where R is hydrogen or the substituent, wherein the substituent is selected from the group consisting of rosin substituents and alkyl substituents of at least 8 carbon atoms, so that an oligomeric aromatic product is formed.

15. The method as described in claim 14 wherein the method comprises the steps of:
(A) reacting the aromatic diisocyanate with a member selected from the group consisting of diamines having at least one substituent thereon and diols having at least one substituent thereon, wherein the substituent is selected from the group consisting of rosin substituents and alkyl substituents of at least 8 carbon atoms, so that an oligomeric aromatic intermediate is formed; and
(B) capping the oligomeric aromatic intermediate with a capping compound which is a member selected from the group consisting of monoalcohols and monoamines.

16. The method as described in claim 14 wherein the oligomeric product is formed by reacting the aromatic diisocyanate with the diamine or dialcohol in a ratio, based on equivalents, of diisocyanate:diamine or diol of between 0.67:1 and 1.33:1 but not between 0.95:1 and 1.05:1.

17. The method of making dispersants as described in claim 14 wherein the aromatic diisocyanate is a member selected from the group consisting of phenylene diisocyanate, toluene diisocyanate, methylene diphenylene diisocyanate, xylylene diisocyanate, tetramethylxylene diisocyanate, naphthalene diisocyanate, polymethylene polyphenyl isocyanate, polyisocyanurates of toluene diisocyanates and toluene diisocyanate-based adducts of triols.

18. The method as described in claim 14 wherein the diisocyanate is reacted with an aliphatic diamine.

19. The method as described in claim 14 wherein the diisocyanate is reacted with an aliphatic diol.

20. The method as described in claim 14 wherein the diisocyanate is reacted with an aliphatic diamine having a rosin substituent thereon.

21. The method as described in claim 14 wherein the diisocyanate is reacted with an aliphatic diol having a rosin substituent thereon.

22. The method as described in claim 14 wherein the diisocyanate is reacted with an aliphatic diamine having an alkyl substituent thereon, the alkyl substituent having at least 8 carbon atoms.

23. The method as described in claim 14 wherein the diisocyanate is reacted with an aliphatic diol having an alkyl substituent thereon, the alkyl substituent being comprised of at least 8 carbon atoms.

24. The method as described in claim 15 wherein the oligomeric intermediate is capped by reacting the intermediate with a capping compound selected from the group consisting of substituted monoamines and substituted monoalcohols, the substituent being selected from the group consisting of rosin substituents and alkyl substituents having at least 8 carbon atoms thereon.

25. The method as described in claim 15 wherein the capping compound has a dialkyl substituent thereon.

26. A dispersion of a finely divided organic solid in an organic liquid containing from 1 weight percent to 20 weight percent, based on weight of solids, of an oligomeric aromatic dispersant according to claim 1.

27. A dispersion as described in claim 26 wherein the dispersant is present in an amount between 5 weight percent and 12 weight percent, based on weight of solids.

28. A dispersion as described in claim 26 wherein the finely divided organic solid is an organic pigment.

29. A dispersion as described in claim 26 wherein the organic solid is an organic pigment selected from the group consisting of monoazo pigments, disazo pigments, phthalocyanine pigments, quinacridone pigments, and carbon black pigments.

30. A dispersion as described in claim 26 wherein the organic liquid is a member selected from the group consisting of aliphatic middle distillates, toluene, low boiling aliphatic distillates, and low boiling esters, ketones, and alcohols.

31. A method of making a pigment dispersion comprising high-shear mixing an organic pigment in the presence of an oligomeric aromatic dispersant according to claim 1.

32. The method as described in claim 31 wherein the high-shear mixing is carried out in a mixer selected from the group consisting of high speed disc dispersers, kneaders, media mills, 3-roll mills, and 2-roll mills.

33. The method as described in claim 31 wherein the dispersion is used in an oil-based printing ink.

34. The method as described in claim 31 wherein the dispersion is used in a solvent-based printing ink.

35. The method as described in claim 31 wherein the dispersion is used in a paint.

36. The method as described in claim 31 wherein the pigment is selected from the group consisting of monoazo pigments, disazo pigments, phthalocyanine pigments, quinacridone pigments, and carbon black pigments.

37. A method of making a pigment dispersion comprising milling an organic pigment crude in the presence of an oligomeric aromatic dispersant according to claim 1.

38. The method as described in claim 37 wherein the milling is carried out in a grinding media mill selected from the group consisting of ball mills and shot mills.

39. The method as described in claim 37 wherein the dispersion is used in a solvent-based printing ink.

40. The method as described in claim 37 wherein the dispersion is used in an oil-based printing ink.

41. The method as described in claim 37 wherein the dispersion is used in a paint.

42. The method as described in claim 37 wherein the pigment crude is selected from the group consisting of monoazo pigment crudes, disazo pigment crudes, phthalocyanine pigment crudes, quinacridone pigment crudes, and carbon black pigment crudes.

* * * * *